United States Patent
Ikeki

(10) Patent No.: US 9,221,303 B2
(45) Date of Patent: Dec. 29, 2015

(54) PNEUMATIC TIRE

(71) Applicant: Sumitomo Rubber Industries, Ltd., Kobe-Shi, Hyogo (JP)

(72) Inventor: Shigetaka Ikeki, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/176,727

(22) Filed: Feb. 10, 2014

(65) Prior Publication Data

US 2014/0238565 A1 Aug. 28, 2014

(30) Foreign Application Priority Data

Feb. 25, 2013 (JP) ................. 2013-034936

(51) Int. Cl.
*B60C 11/117* (2006.01)
*B60C 11/03* (2006.01)

(52) U.S. Cl.
CPC ......... *B60C 11/0302* (2013.04); *B60C 11/0304* (2013.04); *B60C 11/032* (2013.04); *B60C 2011/0372* (2013.04); *B60C 2011/0374* (2013.04)

(58) Field of Classification Search
CPC  B60C 11/03; B60C 11/0302; B60C 11/0304; B60C 11/032; B60C 1/033; B60C 2011/0358; B60C 2011/0374; B60C 2011/0381; B60C 2200/10
USPC ................. 152/209.1, 209.8, 209.11, 209.18, 152/209.28, 903; D12/505, 525–532, 533, D12/535, 557–567, 592–603
See application file for complete search history.

(56) References Cited

U.S. PATENT DOCUMENTS

| | | | | |
|---|---|---|---|---|
| 1,127,517 A | * | 2/1915 | Richardson | 152/209.28 |
| 4,832,099 A | * | 5/1989 | Matsumoto | 152/209.23 |
| D346,351 S | * | 4/1994 | Suzuki | D12/535 |
| 5,423,364 A | * | 6/1995 | Himuro | 152/209.18 |
| D414,451 S | * | 9/1999 | Hara | D12/535 |
| D420,312 S | * | 2/2000 | Hara | D12/535 |
| 6,382,282 B1 | * | 5/2002 | Vormfenne | 152/209.18 |
| D522,449 S | * | 6/2006 | Toyozawa et al. | D12/535 |
| D587,645 S | * | 3/2009 | Steinbach | D12/535 |
| 8,006,729 B2 | * | 8/2011 | Ebiko | 152/209.15 |
| D678,177 S | * | 3/2013 | Larregain | D12/535 |
| D678,179 S | * | 3/2013 | Larregain | D12/535 |

(Continued)

FOREIGN PATENT DOCUMENTS

JP 2009-23654 A 2/2009

*Primary Examiner* — Eric Hug

(74) *Attorney, Agent, or Firm* — Birch Stewart Kolasch & Birch, LLP

(57) ABSTRACT

A pneumatic tire is provided in the tread portion with major oblique grooves disposed staggeredly on both sides of the tread pattern's center line, and plural minor oblique grooves disposed between the circumferentially adjacent major oblique grooves. The major and minor oblique grooves extend toward the counter-tire-rotational direction while increasing the angle with respect to the circumferential direction. When the axial width between the tread pattern's center line and a tread edge is evenly partitioned into 1st to 5th zones in this order from the center line, the angle $\theta$ of the major oblique groove satisfies: $\theta1<\theta2=<\theta3=<\theta4=<\theta5$ and $\theta5-\theta1=50$ to 110 degrees, wherein $\theta1$ to $\theta5$ are mean values of the angle $\theta$ in the 1st to 5th zones. Each major oblique groove is provided in the 1st or 2nd zone with a bent point at which the angle $\theta$ changes at least 30 degrees.

9 Claims, 5 Drawing Sheets

(56) References Cited

U.S. PATENT DOCUMENTS

| | | | | |
|---|---|---|---|---|
| D680,056 S | * | 4/2013 | Nakagawa | D12/535 |
| D680,945 S | * | 4/2013 | Ikeki | D12/563 |
| D684,521 S | * | 6/2013 | Larregain | D12/535 |
| 2005/0115653 A1 | * | 6/2005 | Miyasaka et al. | 152/209.1 |
| 2011/0253276 A1 | * | 10/2011 | Misani et al. | 152/209.18 |

* cited by examiner

PNEUMATIC TIRE

BACKGROUND OF THE INVENTION

The present invention relates to a pneumatic tire, more particularly to a unidirectional tread pattern suitable for racing, capable of improving steering stability and wear resistance on dry roads and drainage performance on wet roads.

In Japanese Patent Application Publication No. 2009-23654, a pneumatic tire having a tread pattern shown in FIG. 5 is disclosed as being capable of improving the tread wear life, without sacrificing steering stability in dry conditions and wet conditions.

In this tread pattern, main oblique grooves (b) are disposed staggeredly on both sides of the tire equator (a), and the main oblique groove (b) extends toward the opposite direction CR to the intended tire rotational direction from a starting point (b1) near the tire equator to a position outside the tread edge (E), while describing a convex curve having a specific curvature.

Between every two of the circumferentially-adjacent major oblique grooves (b), one minor oblique groove (c) is disposed so as to incline to the opposite direction CR to the intended tire rotational direction.

The axially outer end of the minor oblique groove (c) is closed at a position axially inside the tread edge E.

Such tire may exhibit good drainage performance on wet roads covered with water whose depth is relatively shallow. But, on wet roads covered with deep water, the axially outer ends of the minor oblique grooves (c) are submerged in the water, therefore, sufficient drainage can not be obtained. Thus, there is room for improvement in the drainage performance especially on the wet roads covered with deep water.

Further, at the starting point (b1), the minor oblique groove (c) intersects with the major oblique groove (b).

As a result, a tread part between the minor and major oblique groove (c and b) is decreased in the rigidity disadvantageously to the steering stability and wear resistance on dry roads. Thus, there is room for improvement in the steering stability and wear resistance on dry roads.

SUMMARY OF THE INVENTION

It is therefore, an object of the present invention to provide a pneumatic tire in which steering stability and wear resistance on dry roads and drainage performance on wet roads can be improved at high levels.

According to the present invention, a pneumatic tire having an intended tire rotational direction comprises a tread portion provided with a tread pattern defined by tread grooves and having a tread pattern center line positioned at a certain distance from the tire equator of not more than 15% of a zero-camber tread width, the tread grooves including major oblique grooves and minor oblique grooves disposed on each side of the tread pattern center line, wherein each of the major oblique grooves extends toward the opposite direction CR to the intended tire rotational direction from its axially inner closed end at a first axial position to its axially outer open end opened in the tire shoulder, while increasing its angle $\theta$ with respect to the tire circumferential direction, and each of the minor oblique grooves extends toward the opposite direction CR to the intended tire rotational direction from its axially inner closed end at a second axial position axially outside the first axial position to its axially outer open end opened in the tire shoulder, while increasing its angle $\beta$ with respect to the tire circumferential direction, wherein the major oblique grooves on one side of the tread pattern center line are circumferentially shifted from the major oblique grooves on the other side of the tread pattern center line so that the major oblique grooves are arranged staggeredly on both sides of the tread pattern center line, on each side of the tread pattern center line, a plurality of the minor oblique grooves are disposed between every two of the circumferentially adjacent major oblique grooves, without intersecting the major oblique grooves, on each side of the tread pattern center line, if the axial width between the center line and a zero-camber tread edge is partitioned into five equi-width zones which are 1st to 5th zones in this order from the center line, the angle $\theta$ of each of the major oblique grooves satisfies the following equations (1) and (2):

$$\theta 1 < \theta 2 = < \theta 3 = < \theta 4 = < \theta 5 \qquad (1)$$

$$50 \text{ degrees} = <(\theta 5 - \theta 1) = <110 \text{ degrees} \qquad (2)$$

wherein $\theta 1$ to $\theta 5$ are mean values of the angle $\theta$ in the 1st to 5th zones, respectively, and the major oblique grooves respectively have largely bent points, at which the angle $\theta$ changes at least 30 degrees, and which are positioned in one of the 1st zone and 2nd zone.

Preferably, the mean value $\theta 1$ is not smaller than $-10$ degrees, wherein $-$ (minus sign) means that the concerned groove part inclines to the opposite side of the center line to the side on which the concerned groove part is located, in the course from the first axial position to the position axially outside the tread edge, and the mean value $\theta 5$ is not larger than 110 degrees, wherein
values over 90 degrees means that the concerned groove part inclines to the intended tire rotational direction, in the course from the first axial position to the position axially outside the tread edge.

Preferably, the part of the major oblique groove located on the tread pattern center line side of the largely bent point has a circumferential length Li in a range of from 0.7 to 1.5 times the circumferential pitch length Lp between the circumferentially adjacent major oblique grooves.

Preferably, the number of the minor oblique grooves disposed between every two of the circumferentially adjacent major oblique grooves is 2, 3 or 4, and
the minimum distance L1 between each of the minor oblique
grooves and the part of the major oblique groove located on
the tread pattern center line side of the largely bent point is
4 to 14 mm.

Preferably, the part of the major oblique groove located on the tread pattern center line side of the largely bent point is provided with an additional bent point, and from the additional bent point to the axially inner closed end, the major oblique groove is substantially parallel with the tire circumferential direction.

The above-mentioned zero-camber tread edges Te are the axial outermost edges of the ground contacting patch of the tire at the camber angle of zero in its normally inflated loaded condition.

The zero-camber tread width TW is the axial distance between the zero-camber tread edges measured in a normally inflated unloaded condition of the tire.

The normally inflated unloaded condition is such that the tire is mounted on a standard wheel rim and inflated to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure is uniformly defined by 180 kPa. If there is no standard which is applicable to the tire due to racing purpose for example, those recommended by the tire manufacturer, namely, a design rim, design pressure and design maximum load are used.

In this application including specification and claims, various dimensions, positions and the like of the tire refer to those under the normally inflated unloaded condition of the tire unless otherwise noted.

DESCRIPTION OF THE PREFERRED EMBODIMENTS

Embodiments of the present invention will now be described in detail in conjunction with the accompanying drawings.

According to the present invention, pneumatic tire 1 comprises a tread portion 2 provided with a tread pattern defined by tread grooves.

The center line 3 of the tread pattern, which is a straight line parallel with the tire circumferential direction, is positioned at a certain axial distance Lc from the tire equator Co. The axial distance Lc is not more than 15% of the zero-camber tread width TW. The axial distance Lc may be zero but preferably more than zero.

In a high-performance passenger car, a racing car or the like, usually tires are mounted on the wheels having a negative camber in order to improve cornering performance. Accordingly, the center of the ground contact width of such tire shifts inward from the tire equator Co.

Therefore, it is preferable that the above-mentioned distance Lc is set so that the tread pattern center line 3 coincides with the center of the ground contact width of the tire mounted with such certain negative camber.

The tread grooves include major oblique grooves 4 and minor oblique grooves 5 disposed on each side of the tread pattern center line 3.

In this embodiment, the tread grooves include no grooves other than the oblique grooves 4 and 5.

Figure 1:
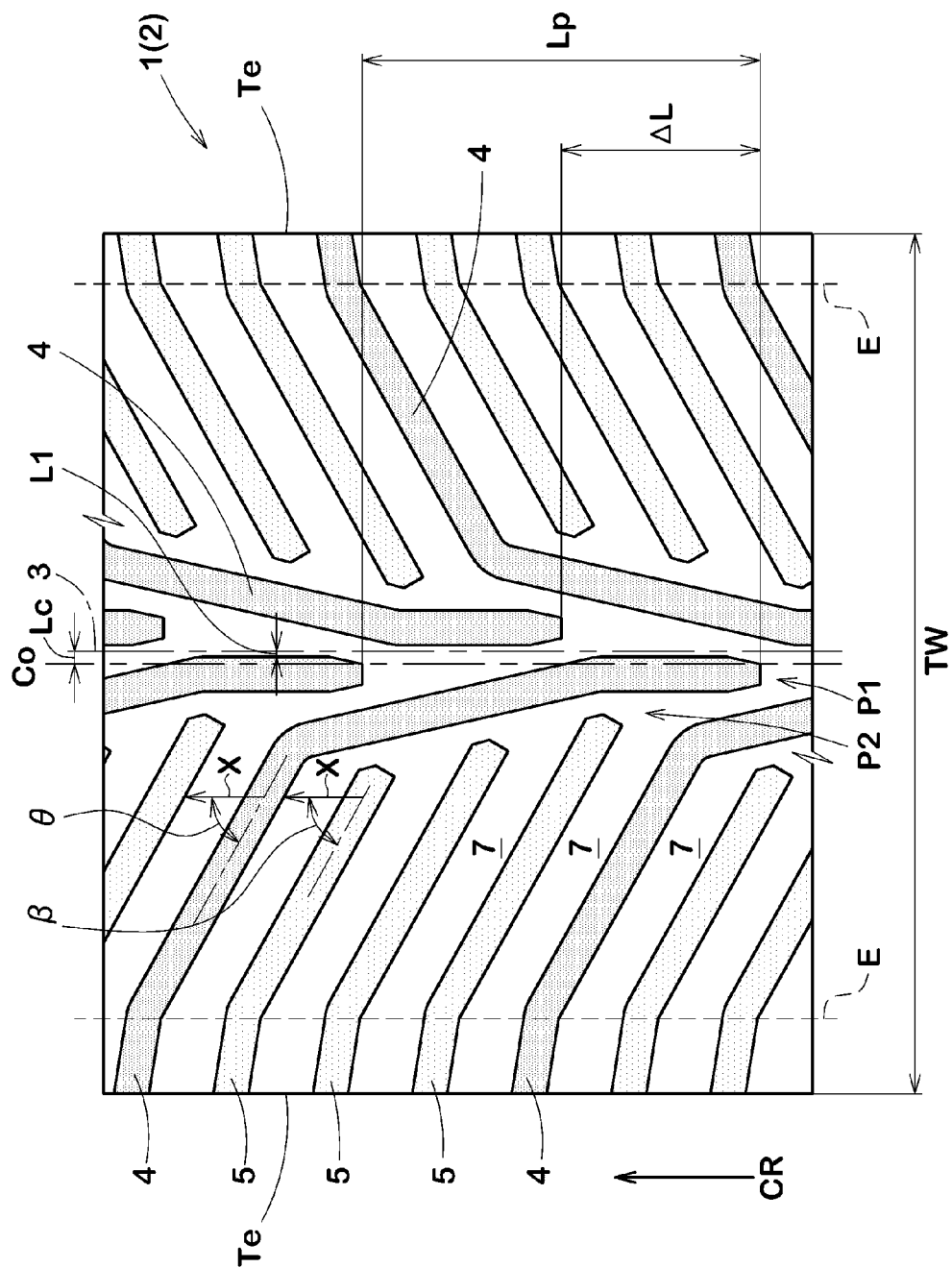
FIG. 1 is a developed partial view of the tread portion of a pneumatic tire according to the present invention showing a tread pattern.

As shown in FIG. 1, the major oblique grooves 4 on one side of the tread pattern center line 3 are circumferentially shifted from those on the other side so that the major oblique grooves 4 are arranged staggeredly on both sides of the tread pattern center line 3. The circumferential shift ΔL therebetween is set to be substantially ½ of the circumferential pitch length Lp between the circumferentially adjacent major oblique grooves 4.

Each of the major oblique grooves 4 extends toward the opposite direction CR to the intended tire rotational direction from its axially inner closed end to its axially outer open end, while gradually increasing its angle θ with respect to a circumferential line x, wherein
the axially inner closed end is positioned at a first axial position P1 near the tread pattern center line 3, and
the axially outer open end is positioned axially outside the undermentioned negative camber tread edge E.

Here, the angle θ may be increased continuously or discontinuously. Thus, all the major oblique grooves 4 are inclined to the opposite direction CR to the intended tire rotational direction.

Each of the major oblique grooves 4 does not cross the tread pattern center line 3, and the minimum distance between the tread pattern center line 3 and each of the major oblique grooves 4 is set in a range of 0.5 to 7.0 mm.

The above-mentioned negative camber tread edges E are as follows. The tire mounted on a standard wheel rim and inflated to a standard inner pressure is tilted at such a camber angle that, in the tire meridian section parallel with the vertical direction, a straight line, which is drawn from the tread pattern center line 3 to the intersecting point between the tire equatorial plane and the tire rotational axis, becomes parallel with the vertical direction. Then, while keeping such tilted state of the tire, the tire is placed on a horizontal plane (road surface) and loaded by a standard tire load. As a result, a ground contacting patch is determined. The negative camber tread edges E are defined by the axially outermost edges of such ground contacting patch.

On each side of the tread pattern center line 3, between every two of the circumferentially adjacent major oblique grooves 4, a plurality of the minor oblique grooves 5 are disposed in parallel with each other, at intervals in the tire circumferential direction, without intersecting with the major oblique grooves 4.

The number of such minor oblique grooves 5 is 2 to 4, in this example 3.

Each of the minor oblique grooves 5 extends toward the opposite direction CR to the intended tire rotational direction from its axially inner closed end to its axially outer open end, while gradually increasing its angle β with respect to a circumferential line x, wherein
the axially inner closed end is positioned at a second axial position P2 axially outside the first axial position P1, and
the axially outer open end is positioned axially outside the negative camber tread edge E.

Here, the angle β may be increased continuously or discontinuously. Thus, all the minor oblique grooves 5 are inclined to the opposite direction CR to the intended tire rotational direction.

On the axially outer side of the after-mentioned largely bent points Q0 of the major oblique grooves 4, the major oblique grooves 4 and the minor oblique grooves 5 are substantially parallel with each other.

Figure 2:
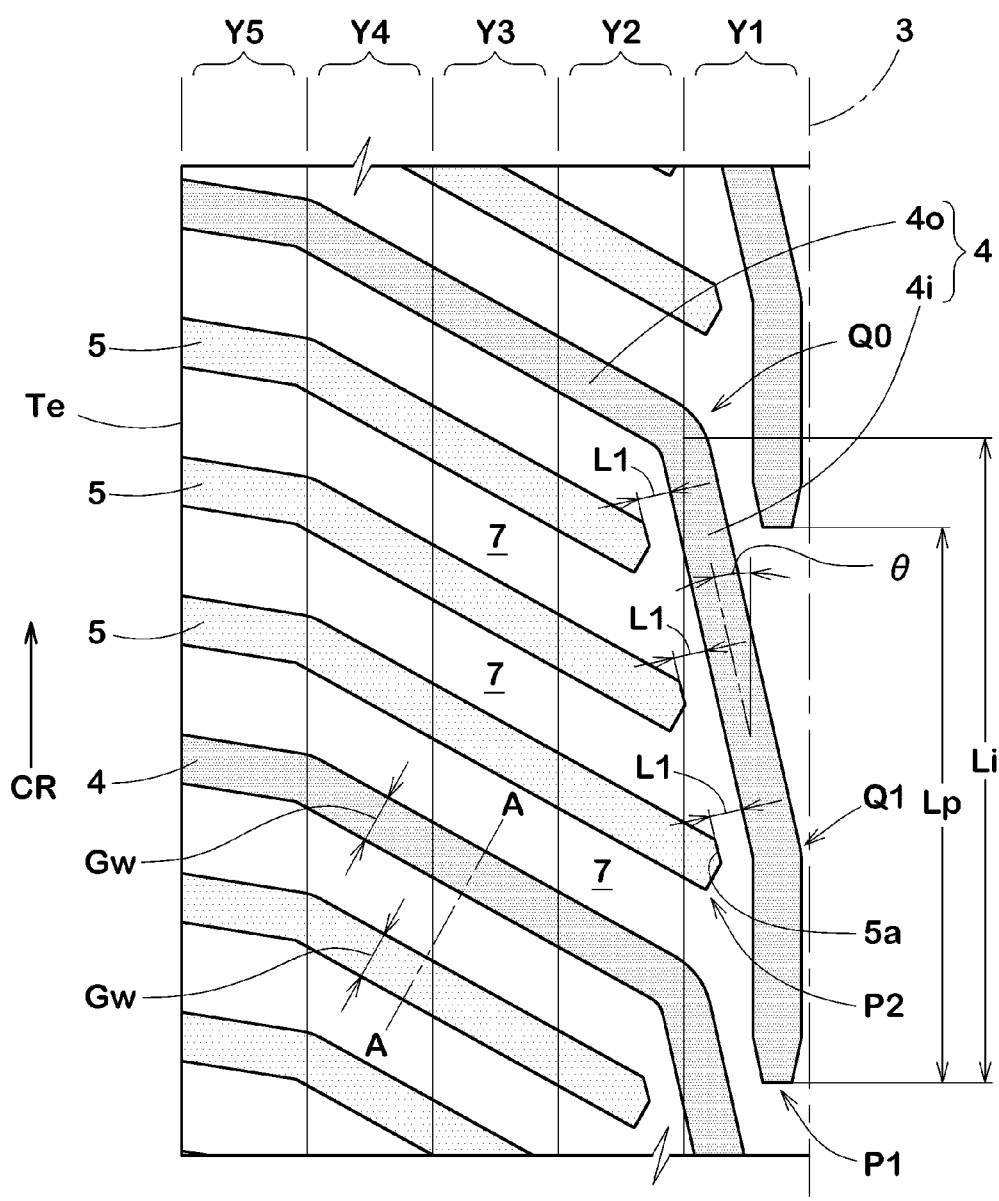
FIG. 2 is a developed view of a part of the tread pattern on one side of the tread pattern center line.

On each side of the tread pattern center line 3, when the axial width between the tread pattern center line 3 and the zero-camber tread edge Te is partitioned into five equi-width zones (1st to 5th zones Y1 to Y5 in this order from the pattern center line 3) as shown in FIG. 2,
the angle θ of the widthwise center line of each of the major oblique grooves 4 satisfies the following equations (1) and (2):

$$\theta1 < \theta2 = <\theta3 = <\theta4 = <\theta5 \qquad (1)$$

$$50 \text{ degrees} = <(\theta5 - \theta1) = <110 \text{ degrees} \qquad (2)$$

wherein
θ1 to θ5 are mean values of the angle θ in the 1st to 5th zones Y1 to Y5, respectively. Here, the mean value is that of a maximum and a minimum of the angle θ in the concerned zone.

Figure 4A:
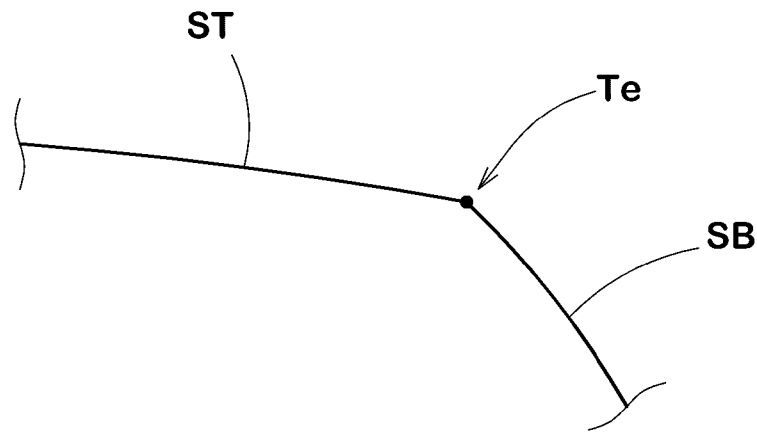
FIG. 4(A) and FIG. 4(B) are diagrams showing contours of an angled tire shoulder portion and a round tire shoulder portion, respectively.
Figure 4B:
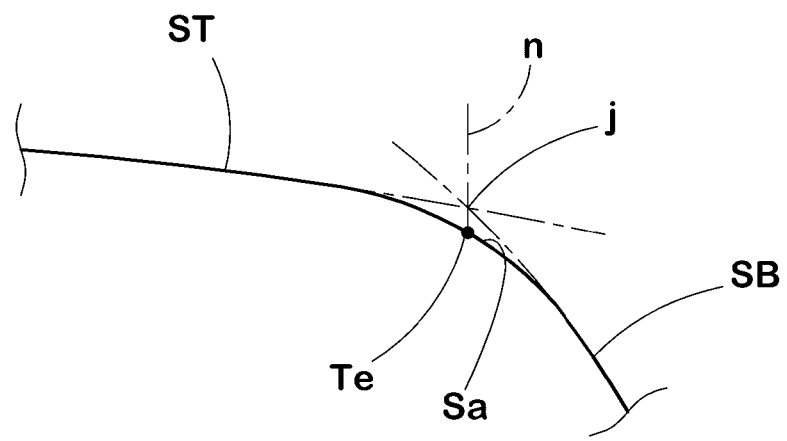
Figure 5:
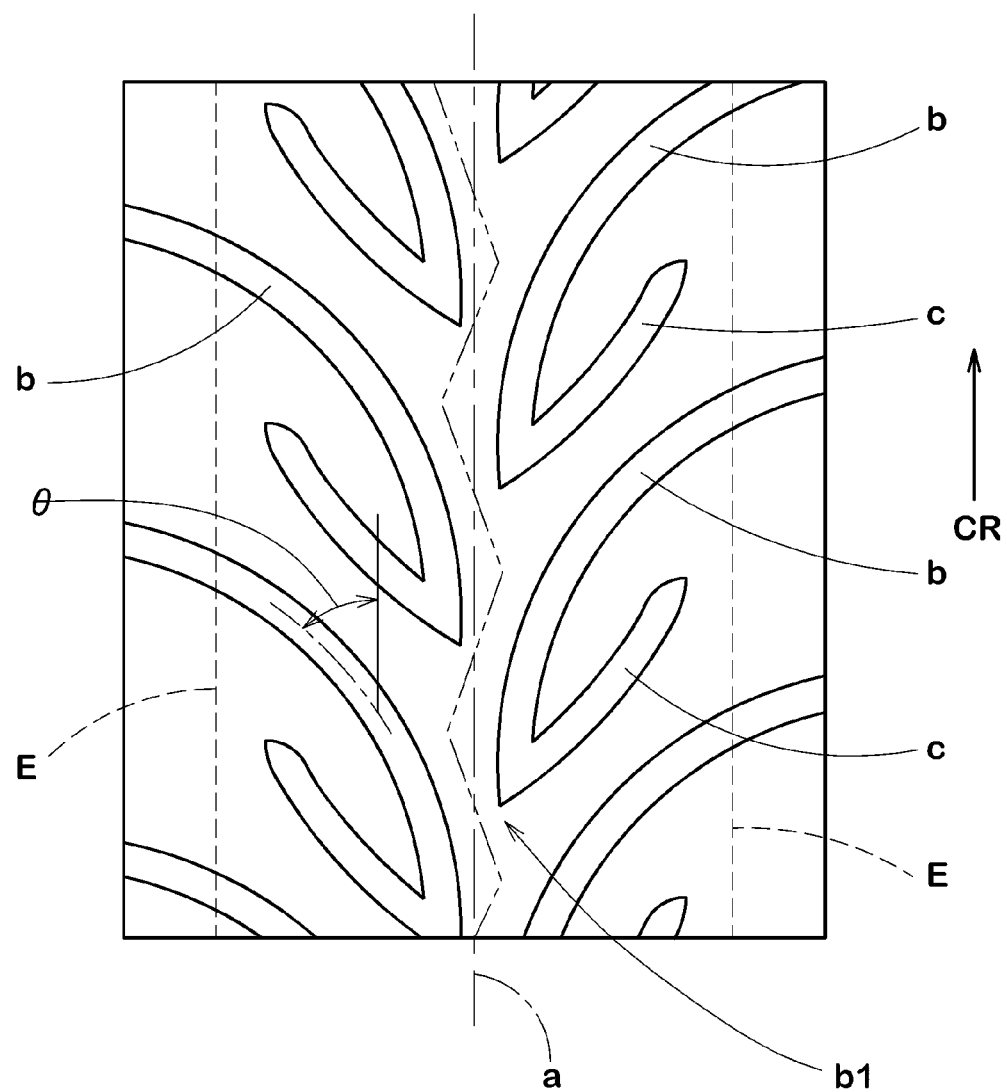
FIG. 5 is a developed partial view a tread portion of a comparative tire.

Incidentally, the zero-camber tread edges Te are usually the same as the angled edges of the angled tire shoulder portion as shown in FIG. 4(A). In the case of the round tire shoulder portion as shown in FIG. 4(B), as a convenient and easy way, the zero-camber tread edges Te may be roughly defined by an intersection of the tire profile and a straight line or flat plane (n) extending parallel with the tire equatorial plane from an intersection (j) between the extension of the profile ST of the tread portion and the extension of the profile SB of the upper sidewall (so called buttress).

It is preferable that the mean value θ1 is not smaller than −10 degrees, and the mean value θ5 is not larger than 110 degrees, wherein − (minus sign) means that the concerned groove part inclines to the opposite side of the tread pattern center line to the side on which the concerned groove part is located, in the course from the first axial position to the position axially outside the tread edge, and
values over 90 degrees means that the concerned groove part inclines to the intended tire rotational direction, in the course from the first axial position to the position axially outside the tread edge.

In this example, the major oblique grooves 4 are respectively provided with largely bent points Q0, at which the angle θ changes largely at least 30 degrees, and which are positioned in the 1st zone Y1 or the 2nd zone Y2.

In the pneumatic tire 1 constructed as above, since the major oblique grooves 4 and the minor oblique grooves 5 extend axially outwardly beyond the negative camber tread edges E and opened in the tire shoulder, even when running on a wet road covered with deep water, the water can be smoothly led axially outwardly beyond the negative camber tread edges E and discharged, therefore, a good wet grip performance can be obtained.

Since the minor oblique grooves 5 extend in the same direction as the major oblique grooves 4, without intersecting with the major oblique grooves 4, the rib-like land portions 7 formed between the minor oblique grooves 5 and 5 and between the minor oblique groove 5 and the major oblique groove 4 are united into one circumferentially continuous land portion, and accordingly, the pattern rigidity can be increased.

Since the mean values θ1 to θ5 satisfies the equation (1), the water can be smoothly led axially outwardly beyond the negative camber tread edges E and discharged.

During cornering on dry roads, the ground pressure of the tire becomes relatively high in the tread shoulder portion (5th zone Y5) on the outside of the turn, and as a result, this portion receives a relatively large lateral force.

Since the equation (2) is satisfied, it is possible to increase the rigidity against the lateral force of the land portions 7 in the vicinity of the 5th zone Y5.

Further, as the land portions 7 continues from the 5th zone Y5 to the 1st zone Y1, motions of the land portions 7 in the vicinity of the 5th zone Y5 can be controlled.

As a result, steering stability and wear resistance during cornering on dry roads can be further improved.

During accelerating or decelerating on dry roads, the load is relatively evenly applied to all over the tread. Since the mean value θ1 is relatively small, deformation of the land portions 7 in the vicinity of the 1st zones Y1 can be effectively decreased.

Further, since the land portions 7 continue from the 1st zones Y1 to the 5th zone Y5, motions of the land portions 7 in the vicinity of the 1st zone Y1 can be controlled.

As a result, steering stability and wear resistance during straight running on dry roads can be improved.

Since the major oblique grooves 4 are provided with the largely bent points Q0 in the first zones Y1 or second zone Y2, the inclination angle θ of the axially inner part 4*i* of the major oblique groove 4 positioned axially inside the largely bent point Q0 becomes close to 0 degree. Therefore, steering stability and wear resistance during straight running can be further improved, and drainage in the vicinity of the tread pattern center line 3 can be increased.

On the other hand, the inclination angle θ of the axially outer part 4*o* of the major oblique groove 4 positioned axially outside the largely bent point Q0 becomes close to 90 degrees. Therefore, steering stability and wear resistance during cornering can be further improved, and drainage in a region axially outside the largely bent point Q0 can be increased.

As explained above, by providing the largely bent point Q0, the major oblique groove 4 is divided into the functionally different axially inner part 4*i* and axially outer part 4*o*, therefore, the above explained advantageous effects can be effectively obtained.

Preferably, the major oblique grooves 4 are each provided with an additional bent point Q1 in the above-mentioned axially inner part 4*i* so that, from the bent point Q1 to the axially inner closed end at the first axial position P1, the axially inner part 4*i* extends substantially parallel with the tire circumferential direction (namely, at an angle of not more than 3 degrees with respect to the tire circumferential direction). With this, drainage performance in the vicinity of the tread pattern center line 3 and steering stability and wear resistance during straight running on dry roads can be further improved.

Preferably, the circumferential length Li of the axially inner part 4*i* is set in a range of from 0.7 to 1.5 times the circumferential pitch length Lp between the circumferentially adjacent major oblique grooves 4.

If the length Li becomes less than 0.7 times the pitch length Lp, a circumferentially long land portion is formed near the pattern center line 3, and the drainage is decreased, therefore, the aquaplaning performance is deteriorated. If the length Li becomes more than 1.5 times the pitch length Lp, the pattern rigidity is decreased near the tread pattern center line 3, which is unfavorable for steering stability and wear resistance during straight running on dry roads.

Preferably, the minimum distance L1 between the second axial position P2 or the axially inner end of each of the minor oblique grooves 5 and the axially inner part 4i of the major oblique groove 4 is set in a range of from 4 to 14 mm.

If the minimum distance L1 becomes less than 4 mm, then the rigidity of the land portion 7 is excessively decreased between the axially inner end (P2) and the axially inner part 4i, which is unfavorable for steering stability and wear resistance during straight running on dry roads. If the minimum distance L1 exceeds 14 mm, then the drainage is decreased, and the resistance to aquaplaning phenomenon is deteriorated.

At the axially inner end (P2), the minor oblique groove 5 has a wall 5a parallel with the axially inner part 4i.

Preferably, the width Gw of the major oblique groove 4 is in a range of 0.3% to 0.7% of the circumferential length of the groove 4, and
the width Gw of the minor oblique groove 5 is in a range of 0.3% to 0.7% of the circumferential length of the groove 5.

If the width Gw is less than 0.3%, it is difficult to obtain a sufficient edge effect on wet roads, and wet grip performance is deteriorated. If the width Gw is more than 0.7%, the groove edges catch on the road surface too much when running on dry roads, and the groove edges wear rapidly.

Preferably, the depth Gh of the major oblique groove 4 and the depth Gh of the minor oblique groove 5 are decreased from a tread pattern center line 3 side toward the zero-camber tread edge Te side, excepting an axially inner end portion of each groove 4, 5 extending 5% of the entire groove length, along the length direction from the axially inner closed end (P1, P2).

In general, when running on wet road at high speed, drainage in the vicinity of the tread pattern center line 3 becomes almost frontward splashing of water, therefore, aquaplaning phenomenon becomes liable to occur as the speed increases.

Therefore, by increasing the groove depth Gh in the vicinity of the tread pattern center line 3 than in the vicinity of the zero-camber tread edge Te, the volume of water introduced in the groove can be increased, and the resistance to aquaplaning can be increased.

Further, in the vicinity of the zero-camber tread edge Te, the rigidity of the land portion 7 is increased, which is favorable for steering stability and wear resistance during cornering on dry roads.

For that purpose, it is preferred that the depth Gh of each groove 4, 5 satisfies the following equation (3):

$$Gh1 >= Gh2 >= Gh3 >= Gh4 >= Gh5 \quad (3)$$

wherein
$Gh1$ to $Gh5$ are mean values of the groove depth Gh in the 1st to 5th zones Y1 to Y5, respectively.

For the same reason, it is preferable that the land ratio Ls (ground contacting area/overall area) satisfies the following equation (4):

$$Ls1 < Ls2 = <Ls3 = <Ls4 = <Ls5 \quad (4)$$

wherein
$Ls1$ to $Ls5$ are values of the land ratio Ls in the 1st to 5th zones Y1 to Y5, respectively.

For the same reason, it is preferable that the angle $\alpha$ of the sidewalls (shown in FIG. 3) of each of the oblique grooves 4 and 5 satisfies the following equation (5):

$$\alpha1 < \alpha2 = <\alpha3 = <\alpha4 = <\alpha5 \quad (5)$$

wherein
$\alpha1$ to $\alpha5$ are mean values of the angle $\alpha$ in the 1st to 5th zones Y1 to Y5, respectively.

Figure 3:
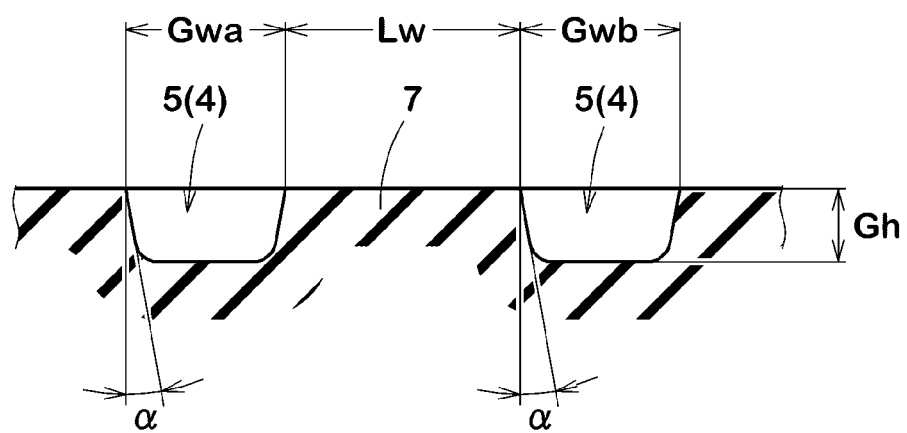
FIG. 3 is a cross sectional view taken along line A-A in FIG. 2.

For the same reason, it is preferable that the following equation (6) is satisfied $$Lw \times 1.2 >= (Gwa + Gwb)/2 >= Lw \times 0.4 \quad (6)$$

wherein
Lw is the width of a land portion 7 formed between the minor oblique grooves 5 and 5 or between the minor oblique groove 5 and the major oblique groove 4, and
Gwa and Gwb are the widths of the oblique grooves (5 and 5) or (4 and 5) between which the land portion 7 is formed as shown in FIG. 3.

If outside this range, the balance between the drainage and rigidity of the land portion becomes worse, and it becomes difficult to achieve the dry performance and wet performance at the same time.

Comparison Tests

Based on the tread pattern shown in FIG. 1, pneumatic tires (size 235/40R18 and 295/35R18) having specifications shown in Table 1 were prepared and tested for steering stability and wear resistance on dry roads and drainage on wet roads.

The distance Lc from the tire equator Co to the tread pattern center line was 10% of the zero-camber tread width TW. Therefore, the test tires were installed on a test car with such a camber angle that, as explained above, the straight line drawn from the tread pattern center line 3 to the intersecting point between the tire equatorial plane and the tire rotational axis, becomes parallel with the vertical direction.

The circumferential shift $\Delta L$ was ½ of the pitch length Lp of the major oblique grooves.

The pitch length Lp of 295/35R18 tire was slightly larger than that of 235/40R18 tire because the diameter of 295/35R18 tire is slightly larger than that of 235/40R18 tire.

The width Gw of the major oblique groove was 12 mm.

Other specifications of the test tires were the same excepting the specifications shown in Table 1.

(1) Steering Stability Test:

The test tires were installed on all the four wheels of a test car, and a time attack was made five times on a dry asphalt road of a test circuit course to obtain the average lap time. The results are indicated in Table 1 by an index based on Embodiment 2 being 100, the larger the index number, the better the steering stability.

test car: Porsche 911(997GT3R)
tire size: front 235/40R18, rear 295/35R18
tire pressure: front 200 kPa, rear 200 kPa (2) Wear Resistance Test:

After the time attack test. visual check for wear was made on the test tires. The results are indicated in Table 1 by an index based on Embodiment 2 being 100, the larger the index number, the better the wear resistance.

(3) Drainage Test:

The test car was run on a wet road in the test circuit course, and the road grip was evaluated by the test driver. The results are indicated in Table 1 by an index based on Embodiment 2 being 100, the larger the index number, the better the drainage.

As shown in Table 1, from the test results, it was confirmed that, according to the present invention, steering stability and wear resistance on dry roads and drainage on wet roads can be improved at high levels.

TABLE 1

| Tire | Ref. 1 | Ref. 2 | Ex. 1 | Ex. 2 | Ex. 3 | Ex. 4 | Ref. 3 | Ex. 5 | Ref. 4 |
|---|---|---|---|---|---|---|---|---|---|
| tread pattern (Fig. No.) | 5 | 1 | 1 | 1 | 1 | 1 | 1 | 1 | 1 |
| Major oblique grooves angle θ | | | | | | | | | |
| satisfy Eq.(1)? *1 | Y | Y | Y | Y | Y | Y | Y | Y | Y |
| satisfy Eq.(2)? *1 | Y | N | Y | Y | Y | Y | N | Y | Y |
| $\theta_1$ (deg.) | 10 | 10 | 10 | 10 | 10 | 10 | 10 | 10 | 10 |
| $\theta_5$ (deg.) | 80 | 50 | 60 | 80 | 110 | 120 | 130 | 80 | 80 |
| bent point Q0 *2 | ab | pre | pre | pre | pre | pre | pre | pre | ab |
| Δθ (deg.) | — | 45 | 45 | 45 | 45 | 45 | 45 | 25 | — |
| bent point Q1 *2 | — | pre | pre | pre | pre | pre | pre | pre | pre |
| Li/Lp(%) | — | 1.1 | 1.1 | 1.1 | 1.1 | 1.1 | 1.1 | 1.1 | — |
| Minor oblique grooves | | | | | | | | | |
| number *3 | 1 | 3 | 3 | 3 | 3 | 3 | 3 | 3 | 3 |
| intersect with major oblique grooves? *1 | Y | N | N | N | N | N | N | N | N |
| distance L1(mm) | — | 10 | 10 | 10 | 10 | 10 | 10 | 10 | 10 |
| Groove depth Gh | | | | | | | | | |
| satisfy Eq.(3)? *1 | Y | Y | Y | Y | Y | Y | Y | Y | Y |
| Gh1(mm) | 6 | 6 | 6 | 6 | 6 | 6 | 6 | 6 | 6 |
| Gh5(mm) | 5 | 5 | 5 | 5 | 5 | 5 | 5 | 5 | 5 |
| Land ratio Ls | | | | | | | | | |
| satisfy Eq.(4)? *1 | Y | Y | Y | Y | Y | Y | Y | Y | Y |
| Ls1(%) | 50 | 50 | 50 | 50 | 50 | 50 | 50 | 50 | 50 |
| Ls5(%) | 65 | 65 | 65 | 65 | 65 | 65 | 65 | 65 | 65 |
| angle α | | | | | | | | | |
| satisfy Eq.(5)? *1 | Y | Y | Y | Y | Y | Y | Y | Y | Y |
| $\alpha_1$ (deg.) | 10 | 10 | 10 | 10 | 10 | 10 | 10 | 10 | 10 |
| $\alpha_5$ (deg.) | 20 | 20 | 20 | 20 | 20 | 20 | 20 | 20 | 20 |
| Steering stability | 104 | 90 | 95 | 100 | 93 | 92 | 90 | 97 | 94 |
| Wear resistance | 117 | 33 | 67 | 100 | 100 | 88 | 67 | 83 | 77 |
| Drainage | 40 | 130 | 120 | 100 | 84 | 75 | 50 | 90 | 86 |

| Tire | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|
| tread pattern (Fig. No.) | 1 | 1 | 1 | 1 | 1 | 1 | 1 | 1 | 1 |
| Major oblique grooves angle θ | | | | | | | | | |
| satisfy Eq.(1)? *1 | Y | Y | Y | Y | Y | Y | Y | Y | Y |
| satisfy Eq.(2)? *1 | Y | Y | Y | Y | Y | Y | Y | Y | Y |
| $\theta_1$ (deg.) | 10 | 10 | 10 | 10 | 10 | 10 | 10 | 10 | 10 |
| $\theta_5$ (deg.) | 80 | 80 | 80 | 80 | 80 | 80 | 80 | 80 | 80 |
| bent point Q0 *2 | pre | pre | pre | pre | pre | pre | pre | pre | pre |
| Δθ (deg.) | 45 | 45 | 45 | 45 | 45 | 45 | 45 | 45 | 45 |
| bent point Q1 *2 | pre | pre | pre | pre | ab | pre | pre | pre | pre |
| Li/Lp(%) | 0.6 | 0.7 | 1.5 | 1.6 | 1.1 | 1.1 | 1.1 | 1.1 | 1.1 |
| Minor oblique grooves | | | | | | | | | |
| number *3 | 3 | 3 | 3 | 3 | 3 | 3 | 3 | 3 | 3 |
| intersect with major oblique grooves? *1 | N | N | N | N | N | N | N | N | N |
| distance L1(mm) | 10 | 10 | 10 | 10 | 10 | 3.0 | 4.0 | 14.0 | 15.0 |
| Groove depth Gh | | | | | | | | | |
| satisfy Eq.(3)? *1 | Y | Y | Y | Y | Y | Y | Y | Y | Y |
| Gh1(mm) | 6 | 6 | 6 | 6 | 6 | 6 | 6 | 6 | 6 |
| Gh5(mm) | 5 | 5 | 5 | 5 | 5 | 5 | 5 | 5 | 5 |
| Land ratio Ls | | | | | | | | | |
| satisfy Eq.(4)? *1 | Y | Y | Y | Y | Y | Y | Y | Y | Y |
| Ls1(%) | 50 | 50 | 50 | 50 | 50 | 50 | 50 | 50 | 50 |
| Ls5(%) | 65 | 65 | 65 | 65 | 65 | 65 | 65 | 65 | 65 |
| angle α | | | | | | | | | |
| satisfy Eq.(5)? *1 | Y | Y | Y | Y | Y | Y | Y | Y | Y |
| $\alpha_1$ (deg.) | 10 | 10 | 10 | 10 | 10 | 10 | 10 | 10 | 10 |
| $\alpha_5$ (deg.) | 20 | 20 | 20 | 20 | 20 | 20 | 20 | 20 | 20 |

TABLE 1-continued

| | | | | | | | | |
|---|---|---|---|---|---|---|---|---|
| Steering stability | 103 | 102 | 85 | 80 | 100 | 85 | 87 | 105 | 105 |
| Wear resistance | 103 | 102 | 80 | 73 | 87 | 80 | 83 | 103 | 103 |
| Drainage | 56 | 70 | 106 | 110 | 90 | 104 | 102 | 66 | 66 |

| Tire | Ex. 15 | Ex. 16 | Ex. 17 | Ex. 18 | Ex. 19 | Ex. 20 | Ex. 21 | Ex. 22 |
|---|---|---|---|---|---|---|---|---|
| tread pattern (Fig. No.) | 1 | 1 | 1 | 1 | 1 | 1 | 1 | 1 |
| Major oblique grooves angle θ | | | | | | | | |
| satisfy Eq.(1)? *1 | Y | Y | Y | Y | Y | Y | Y | Y |
| satisfy Eq.(2)? *1 | Y | Y | Y | Y | Y | Y | Y | Y |
| θ1 (deg.) | 10 | −15 | −10 | 25 | 10 | 10 | 10 | 10 |
| θ5 (deg.) | 80 | 80 | 80 | 80 | 80 | 80 | 80 | 80 |
| bent point Q0 *2 | pre | pre | pre | pre | pre | pre | pre | pre |
| Δθ (deg.) | 45 | 45 | 45 | 45 | 45 | 45 | 45 | 45 |
| bent point Q1 *2 | pre | pre | pre | pre | pre | pre | pre | pre |
| Li/Lp(%) | 1.1 | 1.1 | 1.1 | 1.1 | 1.1 | 1.1 | 1.1 | 1.1 |
| Minor oblique grooves | | | | | | | | |
| number *3 | 2 | 3 | 3 | 3 | 3 | 3 | 3 | 3 |
| intersect with major oblique grooves? *1 | N | N | N | N | N | N | N | N |
| distance L1(mm) | 10 | 10 | 10 | 10 | 10 | 10 | 10 | 10 |
| Groove depth Gh | | | | | | | | |
| satisfy Eq.(3)? *1 | Y | Y | Y | Y | N | Y | Y | Y |
| Gh1(mm) | 6 | 6 | 6 | 6 | 4 | 10 | 6 | 8 |
| Gh5(mm) | 5 | 5 | 5 | 5 | 4 | 5 | 2 | 7.5 |
| Land ratio Ls | | | | | | | | |
| satisfy Eq.(4)? *1 | Y | Y | Y | Y | Y | Y | Y | Y |
| Ls1(%) | 50 | 50 | 50 | 50 | 50 | 50 | 50 | 50 |
| Ls5(%) | 65 | 65 | 65 | 65 | 65 | 65 | 65 | 65 |
| angle α | | | | | | | | |
| satisfy Eq.(5)? *1 | Y | Y | Y | Y | Y | Y | Y | Y |
| α1 (deg.) | 10 | 10 | 10 | 10 | 10 | 10 | 10 | 10 |
| α5 (deg.) | 20 | 20 | 20 | 20 | 20 | 20 | 20 | 20 |
| Steering stability | 100 | 95 | 95 | 97 | 104 | 87 | 103 | 85 |
| Wear resistance | 100 | 83 | 87 | 87 | 113 | 83 | 110 | 77 |
| Drainage | 90 | 60 | 85 | 90 | 66 | 110 | 66 | 112 |

| Tire | Ex. 23 | Ex. 24 | Ex. 25 | Ex. 26 | Ex. 27 | Ex. 28 | Ex. 29 |
|---|---|---|---|---|---|---|---|
| tread pattern (Fig. No.) | 1 | 1 | 1 | 1 | 1 | 1 | 1 |
| Major oblique grooves angle θ | | | | | | | |
| satisfy Eq.(1)? *1 | Y | Y | Y | Y | Y | Y | Y |
| satisfy Eq.(2)? *1 | Y | Y | Y | Y | Y | Y | Y |
| θ1 (deg.) | 10 | 10 | 10 | 10 | 10 | 10 | 10 |
| θ5 (deg.) | 80 | 80 | 80 | 80 | 80 | 80 | 80 |
| bent point Q0 *2 | pre | pre | pre | pre | pre | pre | pre |
| Δθ (deg.) | 45 | 45 | 45 | 45 | 45 | 45 | 45 |
| bent point Q1 *2 | pre | pre | pre | pre | pre | pre | pre |
| Li/Lp(%) | 1.1 | 1.1 | 1.1 | 1.1 | 1.1 | 1.1 | 1.1 |
| Minor oblique grooves | | | | | | | |
| number *3 | 3 | 3 | 3 | 3 | 3 | 3 | 3 |
| intersect with major oblique grooves? *1 | N | N | N | N | N | N | N |
| distance L1(mm) | 10 | 10 | 10 | 10 | 10 | 10 | 10 |
| Groove depth Gh | | | | | | | |
| satisfy Eq.(3)? *1 | Y | Y | Y | Y | Y | Y | Y |
| Gh1(mm) | 6 | 6 | 6 | 6 | 6 | 6 | 6 |
| Gh5(mm) | 5 | 5 | 5 | 5 | 5 | 5 | 5 |
| Land ratio Ls | | | | | | | |
| satisfy Eq.(4)? *1 | Y | N | N | Y | Y | Y | Y |
| Ls1(%) | 30 | 70 | 50 | 50 | 50 | 50 | 50 |
| Ls5(%) | 65 | 65 | 50 | 75 | 65 | 65 | 65 |
| angle α | | | | | | | |
| satisfy Eq.(5)? *1 | Y | Y | Y | Y | N | N | Y |
| α1 (deg.) | 10 | 10 | 10 | 10 | 25 | 6 | 10 |
| α5 (deg.) | 20 | 20 | 20 | 20 | 25 | 5 | 35 |

TABLE 1-continued

| | | | | | | | |
|---|---|---|---|---|---|---|---|
| Steering stability | 87 | 102 | 104 | 105 | 102 | 98 | 102 |
| Wear resistance | 83 | 110 | 107 | 110 | 103 | 87 | 102 |
| Drainage | 108 | 70 | 70 | 66 | 90 | 104 | 92 |

*1 Y = yes, N = no
*2 pre = presence, ab = absence,
*3 the number counted between every two of the major oblique grooves

The invention claimed is:

1. A pneumatic tire having an intended tire rotational direction and comprising a tread portion provided with a tread pattern defined by tread grooves and having a tread pattern center line positioned at a certain distance from the tire equator of not more than 15% of a tread width, the tread grooves including major oblique grooves and minor oblique grooves disposed on each side of the tread pattern center line, wherein each of the major oblique grooves extends toward the opposite direction CR to the intended tire rotational direction from its axially inner closed end at a first axial position to its axially outer open end opened in a tire shoulder, while increasing its angle θ with respect to the tire circumferential direction, and each of the minor oblique grooves extends toward the opposite direction CR to the intended tire rotational direction from its axially inner closed end at a second axial position axially outside the first axial position to its axially outer open end opened in the tire shoulder, while increasing its angle β with respect to the tire circumferential direction, wherein the major oblique grooves on one side of the tread pattern center line are circumferentially shifted from the major oblique grooves on the other side of the tread pattern center line so that the major oblique grooves are arranged staggeredly on both sides of the tread pattern center line, on each side of the tread pattern center line, a plurality of the minor oblique grooves are disposed between every two of the circumferentially adjacent major oblique grooves, without intersecting the major oblique grooves, on each side of the tread pattern center line, if the axial width between the center line and a zero-camber tread edge is partitioned into five equi-width zones which are 1st to 5th zones in this order from the center line, the angle θ of each of the major oblique grooves satisfies the following equations (1) and (2):

$$\theta 1 < \theta 2 = < \theta 3 = < \theta 4 = < \theta 5 \quad (1)$$

$$50 \text{ degrees} = <(\theta 5 - \theta 1) = <110 \text{ degrees} \quad (2)$$

wherein θ1 to θ5 are mean values of the angle θ in the 1st to 5th zones, respectively, and the major oblique grooves respectively have largely bent points, at which the angle θ changes at least 30 degrees, and which are positioned in one of the 1st zone and 2nd zone, and wherein the part of the major oblique groove located on the center line side of the largely bent point has a circumferential length Li in a range of from 0.7 to 1.5 times the circumferential pitch length Lp between the circumferentially adjacent major oblique grooves.

2. The pneumatic tire according to claim 1, wherein the mean value θ1 is not smaller than −10 degrees, wherein − (minus sign) means that the concerned groove part inclines to the opposite side of the center line to the side on which the concerned groove part is located, in the course from the first axial position to the position axially outside the tread edge, and the mean value θ5 is not larger than 110 degrees, wherein values over 90 degrees means that the concerned groove part inclines to the intended tire rotational direction, in the course from the first axial position to the position axially outside the tread edge.

3. The pneumatic tire according to claim 2, wherein the number of the minor oblique grooves disposed between every two of the circumferentially adjacent major oblique grooves is 2, 3 or 4, and the minimum distance L1 between each of the minor oblique grooves and the part of the major oblique groove located on the tread pattern center line side of the largely bent point is 4 to 14 mm.

4. The pneumatic tire according to claim 1, wherein the number of the minor oblique grooves disposed between every two of the circumferentially adjacent major oblique grooves is 2, 3 or 4, and the minimum distance L1 between each of the minor oblique grooves and the part of the major oblique groove located on the tread pattern center line side of the largely bent point is 4 to 14 mm.

5. The pneumatic tire according to claim 2, wherein the part of the major oblique groove located on the tread pattern center line side of the largely bent point is provided with an additional bent point, and from the additional bent point to the axially inner closed end, the major oblique groove is substantially parallel with the tire circumferential direction.

6. The pneumatic tire according to claim 1, wherein the part of the major oblique groove located on the tread pattern center line side of the largely bent point is provided with an additional bent point, and from the additional bent point to the axially inner closed end, the major oblique groove is substantially parallel with the tire circumferential direction.

7. A pneumatic tire having an intended tire rotational direction and comprising a tread portion provided with a tread pattern defined by tread grooves and having a tread pattern center line positioned at a certain distance from the tire equator of not more than 15% of a tread width, the tread grooves including major oblique grooves and minor oblique grooves disposed on each side of the tread pattern center line, wherein each of the major oblique grooves extends toward the opposite direction CR to the intended tire rotational direction from its axially inner closed end at a first axial position to its axially outer open end opened in a tire shoulder, while increasing its angle θ with respect to the tire circumferential direction, and each of the minor oblique grooves extends toward the opposite direction CR to the intended tire rotational direction from its axially inner closed end at a second axial position axially outside the first axial position to its axially outer open end opened in the tire shoulder, while increasing its angle β with respect to the tire circumferential direction, wherein the major oblique grooves on one side of the tread pattern center line are circumferentially shifted from the major oblique grooves on the other side of the tread pattern center line so that the major oblique grooves are arranged staggeredly on both sides of the tread pattern center line, on each side of the tread pattern center line, a plurality of the minor oblique grooves are disposed between every two of the circumferentially adjacent major oblique grooves, without intersecting the major oblique grooves, on each side of the tread pattern center line, if the axial width between the center line and a zero-camber tread edge is partitioned into five equi-width zones which are 1st to 5th zones in this order from the center line, the angle θ of each of the major oblique grooves satisfies the following equations (1) and (2):

$$\theta 1 < \theta 2 = 2 1 \theta 3 = < \theta 4 = < \theta 5 \quad (1)$$

$$50 \text{ degrees} = < (\theta 5 - \theta 1) = < 110 \text{ degrees} \quad (2)$$

wherein θ1 to θ5 are mean values of the angle θ in the 1st to 5th zones, respectively, and the major oblique grooves respectively have largely bent points, at which the angle θ changes at least 30 degrees, and which are positioned in one of the 1st zone and 2nd zone, and wherein the number of the minor oblique grooves disposed between every two of the circumferentially adjacent major oblique grooves is 2, 3 or 4, and the minimum distance L1 between each of the minor oblique grooves and the part of the major oblique groove located on the tread pattern center line side of the largely bent point is 4 to 14 mm.

8. The pneumatic tire according to claim 7, wherein the part of the major oblique groove located on the tread pattern center line side of the largely bent point is provided with an additional bent point, and from the additional bent point to the axially inner closed end, the major oblique groove is substantially parallel with the tire circumferential direction.

9. A pneumatic tire having an intended tire rotational direction and comprising a tread portion provided with a tread pattern defined by tread grooves and having a tread pattern center line positioned at a certain distance from the tire equator of not more than 15% of a tread width, the tread grooves including major oblique grooves and minor oblique grooves disposed on each side of the tread pattern center line, wherein each of the major oblique grooves extends toward the opposite direction CR to the intended tire rotational direction from its axially inner closed end at a first axial position to its axially outer open end opened in a tire shoulder, while increasing its angle θ with respect to the tire circumferential direction, and each of the minor oblique grooves extends toward the opposite direction CR to the intended tire rotational direction from its axially inner closed end at a second axial position axially outside the first axial position to its axially outer open end opened in the tire shoulder, while increasing its angle β with respect to the tire circumferential direction, wherein the major oblique grooves on one side of the tread pattern center line are circumferentially shifted from the major oblique grooves on the other side of the tread pattern center line so that the major oblique grooves are arranged staggeredly on both sides of the tread pattern center line, on each side of the tread pattern center line, a plurality of the minor oblique grooves are disposed between every two of the circumferentially adjacent major oblique grooves, without intersecting the major oblique grooves, on each side of the tread pattern center line, if the axial width between the center line and a zero-camber tread edge is partitioned into five equi-width zones which are 1st to 5th zones in this order from the center line, the angle θ of each of the major oblique grooves satisfies the following equations (1) and (2):

$$\theta 1 < \theta 2 = < \theta 3 = < \theta 4 = < \theta 5 \quad (1)$$

$$50 \text{ degrees} = < (\theta 5 - \theta 1) = < 110 \text{ degrees} \quad (2)$$

wherein θ1 to θ5 are mean values of the angle θ in the 1st to 5th zones, respectively, and the major oblique grooves respectively have largely bent points, at which the angle θ changes at least 30 degrees, and which are positioned in one of the 1st zone and 2nd zone, and wherein the part of the major oblique groove located on the tread pattern center line side of the largely bent point is provided with an additional bent point, and from the additional bent point to the axially inner closed end, the major oblique groove is substantially parallel with the tire circumferential direction.

\* \* \* \* \*